Dec. 5, 1939.  H. W. O'DOWD  2,182,735
LIQUID HEATING APPARATUS
Filed Dec. 18, 1936   5 Sheets-Sheet 1

INVENTOR
Henry W. O'Dowd
By Morrison, Kennedy & Campbell
ATTORNEYS.

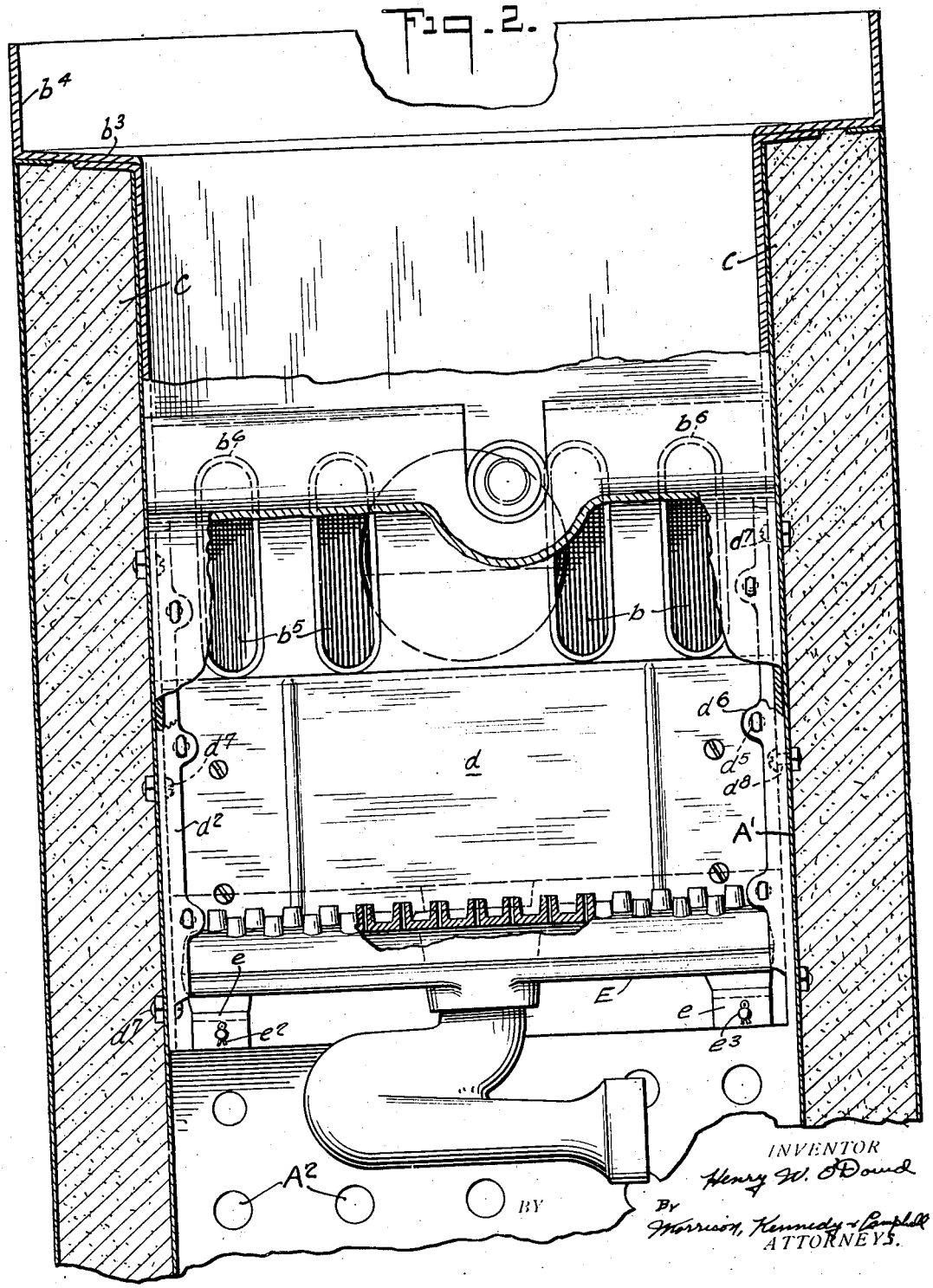

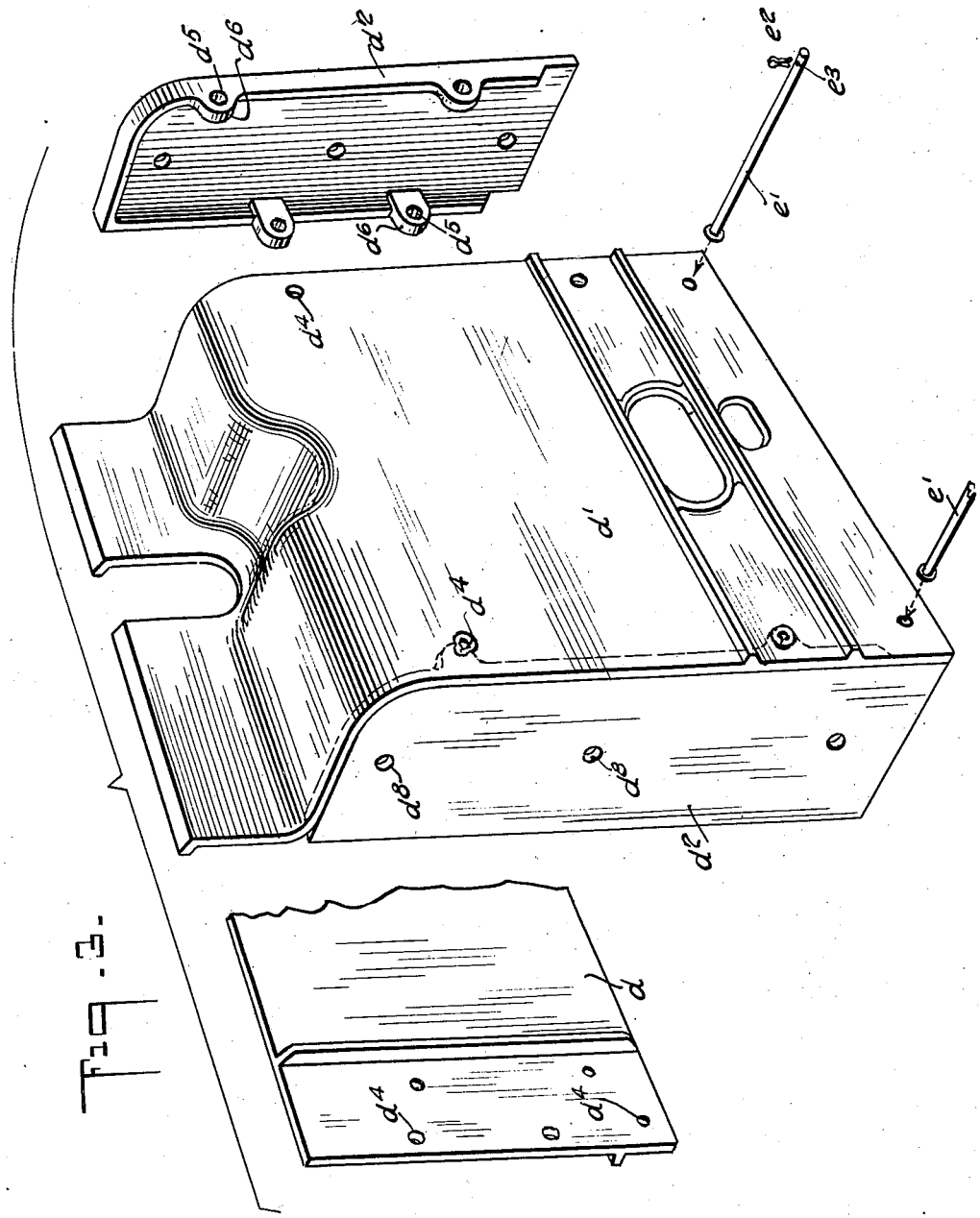

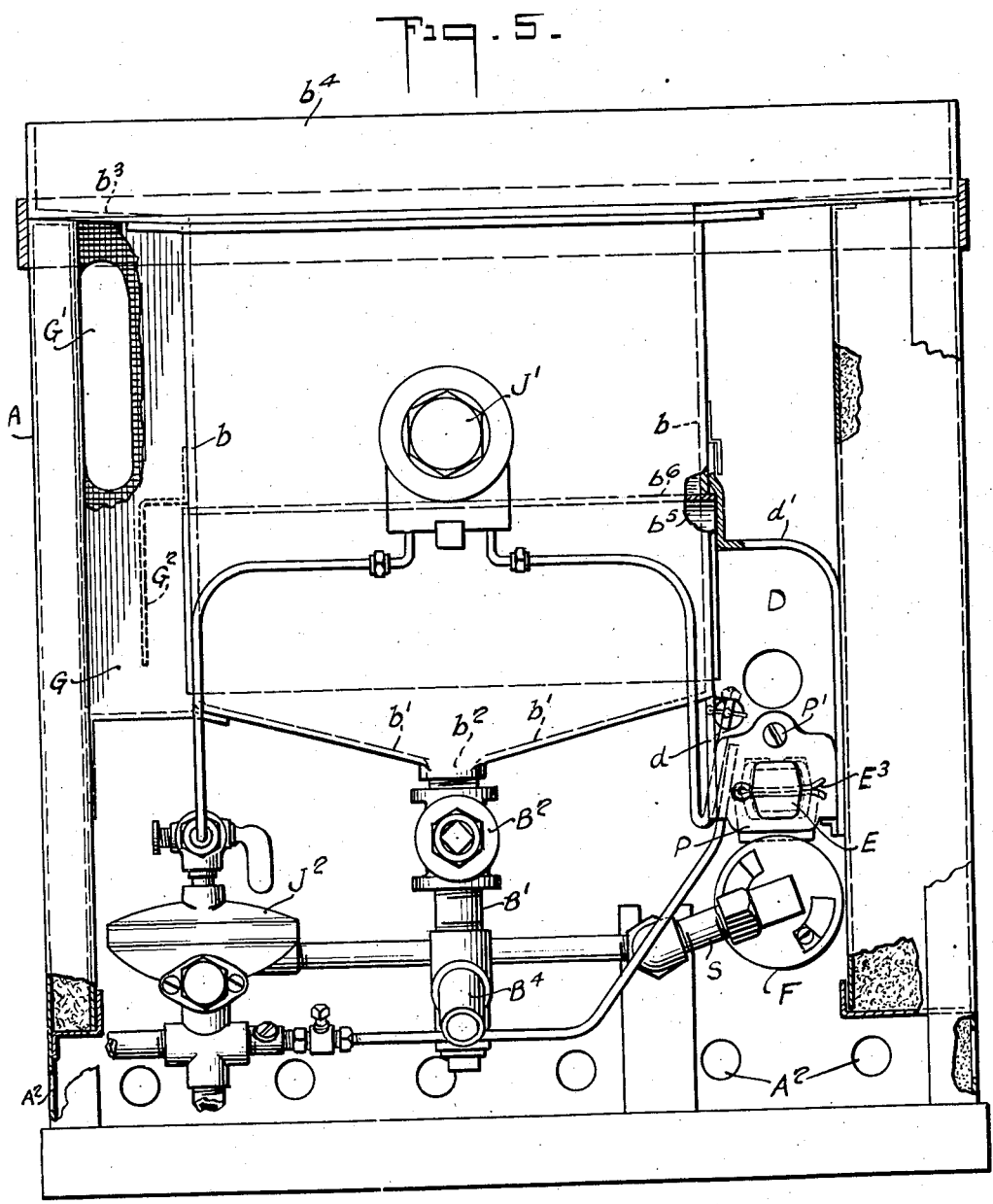

Dec. 5, 1939.  H. W. O'DOWD  2,182,735
LIQUID HEATING APPARATUS
Filed Dec. 18, 1936   5 Sheets-Sheet 5

INVENTOR
Henry W. O'Dowd
BY
Morrison, Kennedy & Campbell
ATTORNEYS.

Patented Dec. 5, 1939

2,182,735

UNITED STATES PATENT OFFICE 2,182,735

LIQUID HEATING APPARATUS

Henry W. O'Dowd, Jersey City, N. J., assignor to Standard Gas Equipment Corporation, a corporation of Maryland Application December 18, 1936, Serial No. 116,518

7 Claims. (Cl. 53—7)

This invention relates to liquid heating apparatus, more particularly of the gas fired variety, and though adapted for general application, is intended especially for cooking purposes, such as deep fat frying.

The object of the invention is to obviate objectionable features of existing liquid heating apparatus, chief among which are waste of fuel and cooking liquid (cooking fat or oil) and impairment of the taste and color of the food cooked. These objectionable features arise from the heating of the cooking liquid by the application of the burner flame directly to the vessel or a portion thereof in immediate contact with the liquid contained therein. Fuel is wasted by the failure to utilize the products of combustion to the fullest extent to heat the liquid and in maintaining at the desired temperature the upper region of the body of liquid wherein the cooking is done and which is remote from the source of heat. The liquid at the point where the heat is applied to the vessel becomes superheated and scorched, causing it to smoke and become discolored, the food in turn being discolored and rendered distasteful thereby, so that the liquid must be renewed frequently when otherwise it could be used for a much longer period. Moreover, particles of food which settle into the superheated region of the vessel carbonize and disintegrate and are carried with the liquid as it circulates throughout the vessel to the cooking area where they become deposited upon the food being cooked.

The present invention overcomes these and other objectionable features by providing means for heating the liquid in the vessel by heat transmitted from a Bunsen burner arranged in a closed combustion chamber so as to avoid impingement of the burner flames on the vessel. More specifically, according to the invention the vessel is equipped with a plurality of heating flues passing through the interior thereof from one side of the vessel to the opposite side and adapted to be surrounded by the liquid therein, the heating flues communicating at one end with the combustion chamber at a point remote from the burner therein, and at their opposite ends with a flue box into which the spent products of combustion are discharged and subsequently vented therefrom. The invention further provides an arrangement whereby the combustion chamber is insulated from the vessel and from the atmosphere to prevent scorching of the liquid and to conserve fuel; and means is arranged in the flue box at the discharge ends of the heating flues to obstruct and retard the passage of the heated products of combustion therethrough and permit a maximum amount of heat to be absorbed by the liquid before the products of combustion pass out through the chimney flue.

In the accompanying drawings, the invention is shown merely by way of example and in preferred form and obviously many variations and modifications thereof may be made which will still be comprised within its spirit. It should be understood, therefore, that the invention is not limited to any specific form or embodiment except insofar as such limitations are specified in the appended claims.

Referring to the drawings:

Fig. 2 is a sectional elevation, some of the parts being broken away, taken on the line 2—2 of Fig. 1;

Fig. 3 is an exploded perspective view of the combustion chamber housing, some of the parts being broken away;

Fig. 5 is a front sectional elevation, some of the parts being broken away, of a modification of the heating apparatus.

In general, the heating apparatus is of the cabinet type enclosed except at the top by a casing A, which houses a liquid containing vessel B, insulated therefrom by suitable insulating material C, and a vertically disposed closed combustion chamber D in which a Bunsen burner E is arranged. The combustion chamber is common to horizontal heating flues $b^5$ communicating therewith and passing through the interior of the vessel B to a flue box G from which the products of combustion are vented through a discharge or chimney flue $G^1$. The burner E is supplied with gas from a manifold H under control of a manually operable stop-cock $H^1$, the manifold and stop-cock being covered by a shield I which protects them from splattering grease and minimizes the danger of accidental operation of the stop-cock. The temperature of the liquid in the vessel is automatically controlled by a thermal couple J, which may be set to operate at the desired temperature by a manual control $J^1$ and which operates through a snap value $J^2$ to control the flow of gas to the burner E. In order to drain used liquid and sediment from the vessel B so that the latter may be cleaned and refilled, there is provided a drain pipe $B^1$ equipped with a valve $B^2$ controlled by an extended handle $B^3$ for opening and closing the valve, the drain pipe $B^1$ discharging into a removable drain pan K. Near its base the casing is perforated as at $A^2$ for the intake of air to support both primary and secondary combustion.

Figure 1:
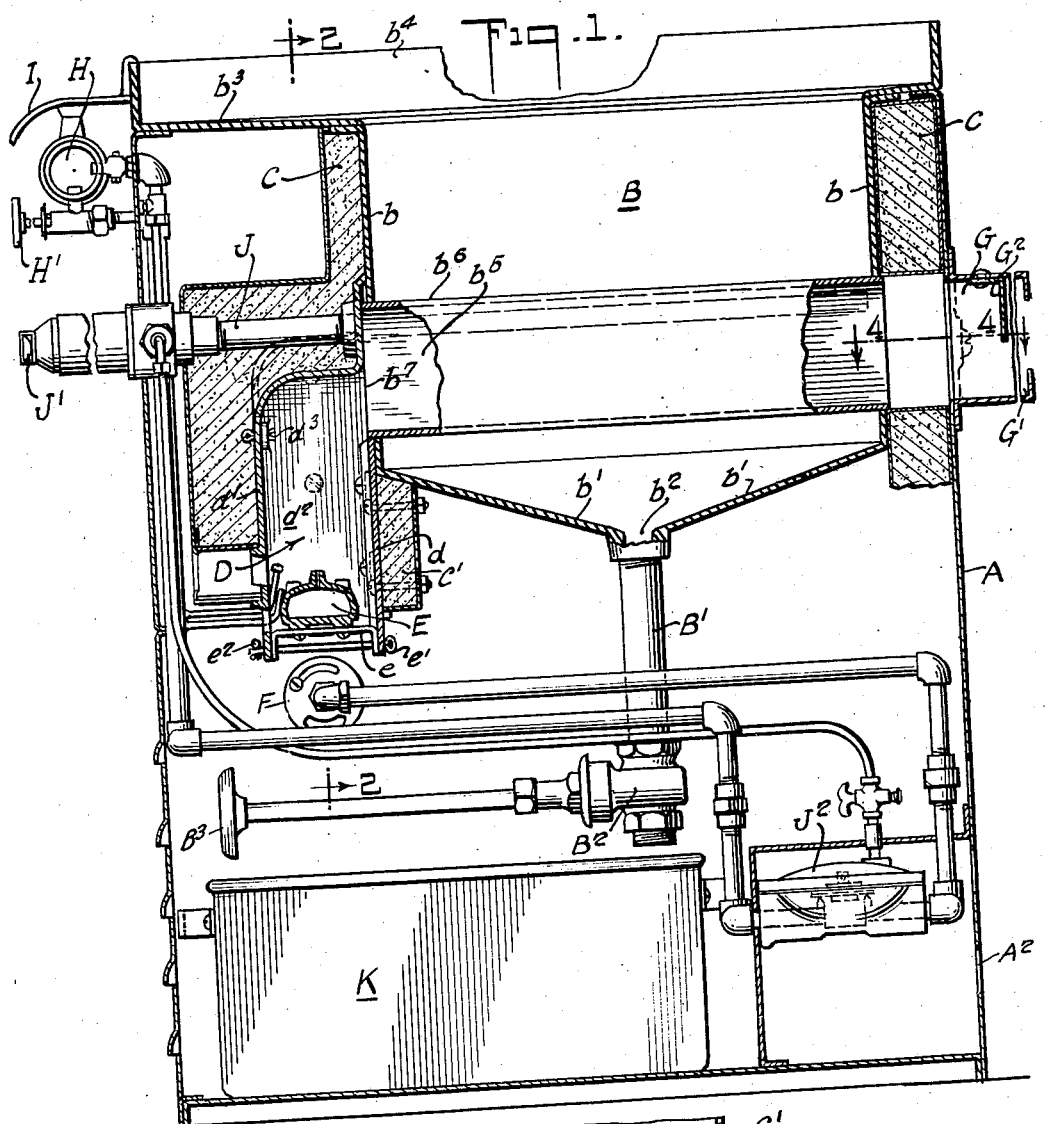
Fig. 1 is a fore and aft sectional elevation through the heating apparatus, some of the parts being broken away to show their construction.

As clearly shown in Fig. 1, the vessel B comprises vertical side walls $b$ and a bottom wall $b^1$, the latter converging from the side walls $b$ toward a central drain opening $b^2$ to which the drain pipe $B^1$ is coupled. The vessel is rimmed at the top by a wide, slightly inclined flange $b^3$ for returning splashed and overflowing liquid to the vessel, and the flange $b^3$ itself is bordered by a high vertical anti-splash rim $b^4$. Near the base of the vessel B, but spaced from the bottom wall $b^1$ thereof, are four heating flues $b^5$ extending fore and aft through the interior of the vessel B and opening through the front and rear walls $b$ to which they are sealed around their edges by welding. The heating flues $b^5$ are of vertically elongated shape having rounded upper and lower surfaces $b^6$ which prevent sediment from collecting on the tops of the flues and also permits the free circulation of the liquid around the flues in intimate contact therewith. The form and arrangement of the flues also enable them to be easily cleaned as well as the portion of the vessel beneath them. The size of the heating flues $b^5$ is regulated to the liquid capacity of the vessel B so that collectively they provide adequate heating surface in order that the liquid in the vessel B may be brought to and maintained at a given temperature with only a minimum amount of fuel being consumed.

The closed combustion chamber D is formed by a rear plate $d$, a front cover plate $d^1$ and side plates $d^2$ (see Fig. 3). The plates $d$ and $d^1$ are removably secured to the side plates $d^2$, as by cotter pins $d^3$ passing through openings $d^4$ formed in the plates $d$ and $d^1$ and adapted to aline with openings $d^5$ formed in flanges $d^6$ on the side plates $d^2$. The plates as a unit are secured in position by stove bolts $d^7$ passing through openings $d^8$ in the side plates $d^2$ and bolted to an insulation retaining wall $A^1$ within the casing A.

As shown in Fig. 1, both the vessel B and the combustion chamber D are insulated from the atmosphere by insulating material C, held in place by the metal retaining wall $A^1$, and additional insulation $C^1$ is secured to the rear plate $d$ of the combustion chamber to insulate the latter from the bottom wall $b^1$ of the vessel. Hence, the liquid in the vessel B is heated by the hot gases passing through the heating flues $b^5$ which communicate with the combustion chamber D each through a port $b^7$, without any direct heating by the burner flames.

According to one feature of the invention, each of the ports $b^7$ is of less area than the cross sectional area of the respective heating flue $b^5$ and located below the upper surface thereof, so that products of combustion entering the heating flue from the combustion chamber D will rise to the top of the flue, out of the direct draft between the combustion chamber and the discharge flue $G^1$.

The burner E is removably supported on brackets $e$ near the open bottom of the combustion chamber D, being located far enough below the ports $b^7$ leading to the heating flues $b^5$ that there can be no impingement of the flames on the inner walls of the flues. It will be noted that the burner supporting brackets $e$ extend transversely of the combustion chamber D, one at each side thereof, and are sustained by long pins $e^1$ passing through alined apertures therein and in the front and rear plates $d^1$ and $d$, respectively, the pins $e^1$ being held from displacement by cotter pins $e^2$ passing through holes $e^3$ formed in the ends of the pins $e^1$ projecting beyond the front plate $d^1$. With this arrangement, the burner E may be easily removed by merely withdrawing the cotter pins $e^2$ and sustaining pins $e^1$, leaving the burner free to be lowered through the bottom of the combustion chamber D.

Figure 4:
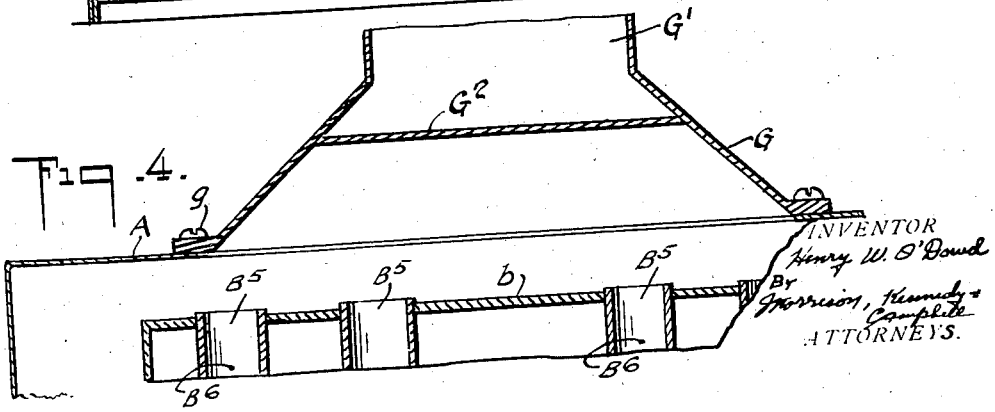
Fig. 4 is a sectional view, some of the parts being broken away, taken on the line 4—4 of Fig. 1, looking in the direction of the arrow.

As best shown in Figs. 1 and 4, the flue box G is removably secured to the casing A, as by stove bolts $g$, and is formed to collect and converge the products of combustion discharged from the heating flues $b^5$ and vent them through the flue $G^1$. For the purpose of obstructing and retarding the passage of the products of combustion through the heating flues $b^5$ and out the flue $G^1$, a baffle plate $G^2$ is arranged to extend transversely of flue box G, depending from the top thereof to a point where it cuts off a direct draft through substantially the upper half of the flues $b^5$ and the flue $G^1$. Thus, with the lower edge of the baffle $G^2$ and the ports $b^7$ terminating below the top walls of the flues $b^5$, a space is defined in the upper portions of the flues throughout their entire lengths for the products of combustion to collect and circulate slowly therethrough to allow ample opportunity for them to give up their heat to the liquid circulating around the exterior of the flues $b^5$.

With the foregoing construction and arrangement of the parts, an advantage by way of economy of operation is derived in addition to those already mentioned. The vertically elongated shape of the heating flues $b^5$ permits their being spaced apart laterally so that each is surrounded by a large body of liquid to absorb heat and, because the heating surface presented by the flues is so great, the entire body of liquid in the vessel B can be rapidly brought to the desired cooking temperature without being superheated at the point of application of the heat. In the absence of superheating, the temperature of the liquid is more uniform throughout the vessel and the thermal couple J, therefore, is not subject to frequent changes in temperature and its operating range can be minimized, both of which advantages are factors in the conservation of fuel.

Figure 6:
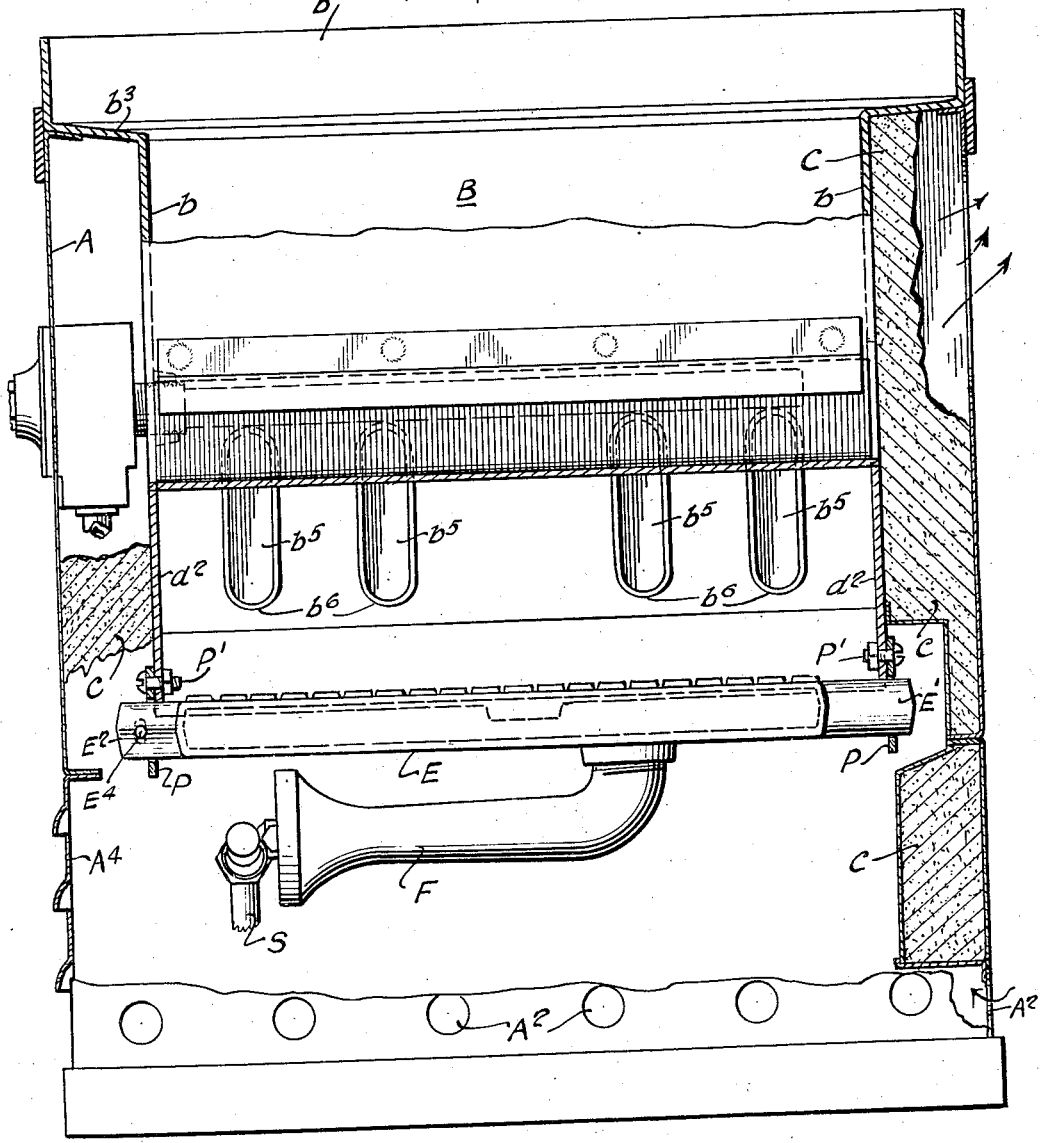
Fig. 6 is a side sectional elevation, some of the parts being broken away, of the modification shown in Fig. 5.

The embodiment of the invention shown in Figs. 5 and 6 is particularly adapted for counter service, where space is a controlling factor in the design of the apparatus. According to this embodiment, the combustion chamber D and the flue box G are located at opposite sides of the vessel B instead of at the front and rear, respectively, and the vessel B is formed to utilize all the space available between the insulation C lining the front and rear walls of the casing A, its depth fore and aft being greater than its width. With the combustion chamber D and flue box G arranged at the sides, the heating flues $b^5$ extend transversely of the vessel B and present short passageways so that the heated gases or products of combustion from the burner have little opportunity to cool before being discharged into the flue box G and, hence, a small burner E may be employed with high efficiency. Moreover, with the heating flues $b^5$ extending from side to side, the greater fore and aft dimension of the vessel B permits four flues to be employed and properly spaced apart so that the heat therefrom is uniformly distributed throughout the vessel and the flues and portions of the vessel beneath them are accessible for cleaning.

The relationship of the heating flues $b^5$ to the combustion chamber D is substantially the same as in the structure shown in Figs. 1 to 4, in that the flues communicate therewith through ports $b^7$ located at a level remote from the burner E in the lower part of the combustion chamber. As before, the combustion chamber is insulated from the atmosphere by insulating material C, but because a small burner E is employed and arranged nearer to the ports $b^7$, it is unnecessary to insulate the rear plate $d$ of the combustion chamber from the bottom of the vessel B. The burner suspension, however, is modified and comprises two plates P, one bolted as at $P^1$ to each side wall $d^2$, formed with apertures through which the ends $E^1$ and $E^2$ of the burner E pass. The end $E^1$ of the burner is round and adapted to fit in a correspondingly shaped aperture formed in one plate P, while the end $E^2$ is formed non-circular in cross section and is adapted to fit in a correspondingly shaped aperture formed in the other plate to prevent the burner from twisting, a cotter pin $E^3$ being arranged in an opening $E^4$ in the end $E^2$ of the burner to prevent the latter from shifting to the right (Fig. 6) out of engagement with the main feed pipe S, which is provided as usual with a nozzle (not shown) projecting into the mixing chamber F of the burner. To remove the burner E, it is necessary merely to remove the cotter pin $E^3$ and shift the burner to the right (Fig. 6) to break the connection between the burner and the nozzle on the supply pipe S and to disengage the end $E^2$ of the burner from its supporting plate P, lower the end $E^2$ of the burner below the plate P and shift the burner to the left to withdraw the end $E^1$ from its supporting plate P. The steps are reversed, of course, to install the burner.

The flue box G (Fig. 5), arranged at the discharge ends of the flues $b^5$, covers the entire side $b$ of the vessel, thus acting as a heating chamber for that side of the vessel which is remote from the burner, and exhausts through the chimney flue $G^1$ formed near the top of the wall of the flue box G at the rear of the apparatus. The baffle plate $G^2$, in this instance, is fastened to the wall $b$ of the vessel at the discharge ends of the flues $b^5$ and is bent outwardly and downwardly to depend in spaced relation thereto to retard the issuance of the heated gases from the upper portions of the flues.

In order to reduce the height of the apparatus, no space is provided for a drain pan for drawing off used liquid and sediment from the vessel B. Provision is made, however, to facilitate draining the vessel by having a nozzle $B^4$ attached to the drain pipe $B^1$ and extending to the front of the apparatus where it is accessible through a door $A^4$ to drain into a receptacle placed or held below it.

Having thus described my invention what I claim is:

1. Deep fat frying apparatus comprising a vessel for containing liquid fat to be heated, a closed combustion chamber arranged exteriorly of and being insulated from the liquid containing vessel, a Bunsen burner arranged and operative to restrict the burner flames to the combustion chamber, and an open-ended heating flue having one end communicating with the combustion chamber in a zone beyond the burner flames and leading from the combustion chamber through the interior of the liquid containing vessel with its opposite end opening exteriorly of the vessel, whereby the liquid fat within the vessel is heated solely by the caloric currents emanating from the burner flames and circulating through the heating flue.

2. Deep fat frying apparatus comprising a vessel for containing liquid fat to be heated, a closed combustion chamber arranged exteriorly at the side of the liquid containing vessel and being insulated therefrom, a Bunsen burner arranged and operative to restrict the burner flames to the combustion chamber, a discharge flue arranged exteriorly at the side of the liquid containing vessel opposite the combustion chamber, and an open-ended heating flue having one end communicating with the combustion chamber in a zone beyond the burner flames and leading from the combustion chamber through the interior of the liquid containing vessel and opening into the discharge flue, whereby the liquid fat within the vessel is heated solely by the caloric currents emanating from the burner flames and circulating through the heating flue from the combustion chamber to the discharge flue.

3. Deep fat frying apparatus comprising a vessel for containing liquid fat to be heated, a vertically disposed closed combustion chamber arranged exteriorly of and being insulated from the liquid containing vessel, a Bunsen burner formed with upwardly directed flame ports arranged at the bottom of the combustion chamber and being operative to restrict the burner flames to the combustion chamber, and an open-ended heating flue having one end communicating with the combustion chamber at the extreme upper end thereof in a zone remote from the burner and beyond the burner flames, the flue leading from the combustion chamber through the interior of the liquid containing vessel and having its opposite end opening exteriorly of the vessel, whereby the liquid fat is heated solely by the caloric currents emanating from the burner flames and circulating through the heating flue.

4. Deep fat frying apparatus comprising a vessel for containing liquid fat to be heated, a closed combustion chamber arranged exteriorly of and being insulated from the liquid containing vessel, a Bunsen burner arranged and operative to restrict the burner flames to the combustion chamber, and a plurality of separate open-ended heating flues communicating each at one end with the combustion chamber in a zone beyond the burner flames and leading from the combustion chamber through the interior of the liquid containing vessel with its opposite end opening exteriorly of the vessel, whereby the liquid fat in the vessel is heated solely by the caloric currents emanating from the burner flames and circulating through the heating flues.

5. Deep fat frying apparatus according to claim 1, including means to retard the circulation of the caloric currents through the heating flue.

6. Deep fat frying apparatus according to claim 1, wherein the heating flue is arranged with its top wall above the level of the top of the combustion chamber and has the lower portion only of its end opening into the combustion chamber.

7. Deep fat frying apparatus according to claim 1, wherein the heating flue is formed within the vessel with a rounded exterior top surface to avoid the accumulation of sediment thereon.

HENRY W. O'DOWD.